United States Patent
Araki et al.

(10) Patent No.: US 7,632,909 B2
(45) Date of Patent: Dec. 15, 2009

(54) SELF-ADHESIVE ORGANOPOLYSILOXANE COMPOSITION

(75) Inventors: Tadashi Araki, Annaka (JP); Takeshi Miyao, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 353 days.

(21) Appl. No.: 11/472,477

(22) Filed: Jun. 22, 2006

(65) Prior Publication Data

US 2006/0293445 A1    Dec. 28, 2006

(30) Foreign Application Priority Data

Jun. 23, 2005    (JP) .............................. 2005-183405

(51) Int. Cl.
*C08G 77/06*    (2006.01)
(52) U.S. Cl. .............................. 528/12; 528/10; 528/15; 528/31; 528/32; 528/34; 528/17; 528/18; 525/474; 525/476; 525/478
(58) Field of Classification Search ................. 525/478, 525/474, 476; 528/15, 31–32, 34
See application file for complete search history.

(56) References Cited

U.S. PATENT DOCUMENTS 5,165,956 A * 11/1992 Wong ........................ 427/96.6
7,059,627 B2 * 6/2006 Ikeno et al. ............... 280/728.1
2003/0211340 A1 * 11/2003 Ikeno et al. ................. 428/447

FOREIGN PATENT DOCUMENTS

| JP | 53-13508 A | 5/1978 |
| JP | 59-5219 B2 | 2/1984 |
| JP | 2003278083 A * | 10/2003 |

* cited by examiner

*Primary Examiner*—Randy Gulakowski
*Assistant Examiner*—Olatunde S Ojurongbe
(74) *Attorney, Agent, or Firm*—Birch, Stewart, Kolasch & Birch, LLP

(57) ABSTRACT

A self-adhesive organopolysiloxane composition is provided comprising (A) an organopolysiloxane containing at least two silicon-bonded alkenyl groups, (B) an organohydrogenpolysiloxane containing at least two SiH groups, (C) a hydrosilylation catalyst, and (D) an adhesive component obtained by previously mixing (i) a titanium chelate catalyst and/or a tetraorganoxytitanium and (ii) a silane coupling agent and aging the mixture. The composition cures at room temperature or lower temperature while it is fully adhesive to metal and plastic substrates.

9 Claims, No Drawings

SELF-ADHESIVE ORGANOPOLYSILOXANE COMPOSITION

CROSS-REFERENCE TO RELATED APPLICATION

This non-provisional application claims priority under 35 U.S.C. §119(a) on Patent Application No. 2005-183405 filed in Japan on Jun. 23, 2005, the entire contents of which are hereby incorporated by reference.

TECHNICAL FIELD

This invention relates to self-adhesive organopolysiloxane compositions which cure at room temperature or lower temperature into products that firmly bond to metal and plastic substrates without primers.

BACKGROUND ART

As is customary in the art, addition curing organopolysiloxane compositions comprising an organopolysiloxane containing silicon-bonded alkenyl groups and an organohydrogenpolysiloxane containing silicon-bonded hydrogen atoms (i.e., SiH groups) undergo addition reaction in the presence of a platinum based catalyst and cure into elastomers. A variety of such compositions are known.

The cured products of these compositions, however, are less adherent to metals and resins. When the compositions are used in such applications as potting and coating of electric circuits, impregnation of motor coils, impregnation of TV flyback transformers, bonding of semiconductor chips to circuit boards, bonding of structure joints, impregnation and coating of film or fabric form resins, there are drawbacks that peel often occurs and some necessary properties are lost.

From the past, efforts have been made to produce addition curing organopolysiloxane compositions that are fully adherent to many different substrates. For example, JP-B 53-13508 discloses an addition curing organopolysiloxane composition comprising a vinyl-containing diorganopolysiloxane, 100 to 1 part by weight of an epoxy and/or ester-containing organohydrogenpolysiloxane, and 0 to 99 parts by weight of an epoxy or ester-free organohydrogenpolysiloxane. JP-B 59-5219 discloses an addition curing organopolysiloxane composition comprising an organopolysiloxane containing trialkoxysilyl, oxirane and hydrosilyl groups on the molecule.

However, the bonding capability of these prior art addition curing organopolysiloxane compositions is insufficient as compared with other resin adhesive compositions like epoxy adhesive compositions. The bond retaining capability relative to metal, plastic and other substrates, and especially to plastic substrates is poor. It would be desirable to further improve a bonding capability.

DISCLOSURE OF THE INVENTION

An object of the invention is to provide self-adhesive organopolysiloxane compositions which cure at room temperature or lower temperature into products that firmly bond to metal, plastic or other substrates, especially to plastic substrates, to which prior art addition curing organopolysiloxane compositions are less adhesive.

The inventors have found that by incorporating in an addition curing organopolysiloxane composition an adhesive component obtained by previously mixing a titanium chelate catalyst and/or an organoxytitanium and a silane coupling agent and aging the mixture, a self-adhesive organopolysiloxane composition is obtained which cures at room temperature or lower temperature while it is fully adhesive to metal, plastic or other substrates, especially to plastic substrates, to which prior art addition curing organopolysiloxane compositions are less adhesive.

Accordingly, the present invention provides a self-adhesive organopolysiloxane composition comprising (A) 100 parts by weight of an organopolysiloxane containing at least two silicon-bonded alkenyl groups on the molecule, (B) an organohydrogenpolysiloxane containing at least two silicon-bonded hydrogen atoms on the molecule, in such an amount that 0.5 to 3.0 silicon-bonded hydrogen atoms are available per silicon-bonded alkenyl group in component (A), (C) an effective amount of a hydrosilylation catalyst, and (D) 0.2 to 10 parts by weight of an adhesive component obtained by previously mixing (i) a titanium chelate catalyst and/or an organoxytitanium of the general formula (1):

$$Ti(OR^1)_4 \qquad (1)$$

wherein $R^1$ is a monovalent hydrocarbon group of 2 to 10 carbon atoms and (ii) a silane coupling agent in a weight ratio (ii)/(i) in the range of 0.2 to 5.0, and aging the mixture.

BENEFITS OF THE INVENTION

The self-adhesive organopolysiloxane composition of the invention cures at room temperature or lower temperature while it is fully adhesive to metal, plastic or other substrates, especially to plastic substrates, to which prior art addition curing organopolysiloxane compositions are less adhesive.

DESCRIPTION OF THE PREFERRED EMBODIMENTS

Component A

The diorganopolysiloxane (A), which is a base polymer of the inventive composition, contains at least two, preferably 2 to 6, silicon atom-bonded alkenyl groups on the molecule.

The molecular structure of the organopolysiloxane (A) is not particularly limited and may be a linear, partially branched linear, cyclic or branched chain, or three-dimensional network, for example. Preferred is a linear diorganopolysiloxane in which the backbone is essentially composed of repeating diorganosiloxane units and both ends of the molecular chain are capped with triorganosiloxy groups.

It is desirable for component (A) to have a viscosity at 25° C. of 100 to 500,000 mPa-s, more desirably 500 to 100,000 mPa-s because the resulting composition is easy to handle and work and the resulting silicone rubber has good physical strength. It is noted that the viscosity is measured by a rotational viscometer at 25° C.

In component (A), suitable alkenyl groups bonded to silicon atoms are alkenyl groups of about 2 to 8 carbon atoms, preferably about 2 to 4 carbon atoms, such as vinyl, allyl, butenyl, pentenyl, hexenyl and heptenyl, with vinyl being most preferred. In the case of organopolysiloxane having a linear structure, the alkenyl groups may be bonded to silicon atoms at ends or side chains of the molecular chain or both.

In addition to the alkenyl groups, the diorganopolysiloxane (A) contains silicon atom-bonded organic groups. Suitable organic groups include unsubstituted or halo-substituted monovalent hydrocarbon groups, for example, alkyl groups, typically $C_1$-$C_{10}$ such as methyl, ethyl, propyl, butyl, pentyl, hexyl, cyclohexyl and heptyl, aryl groups, typically $C_6$-$C_{14}$ such as phenyl, tolyl, xylyl and naphthyl, aralkyl groups, typically $C_7$-$C_{14}$ such as benzyl and phenethyl, and halo-alkyl groups, typically $C_1$-$C_3$ such as chloromethyl, 3-chloropropyl and 3,3,3-trifluoropropyl. Of these, methyl and phenyl are most preferred.

Examples of the organopolysiloxane (A) include trimethylsiloxy end-capped dimethylsiloxane-methylvinylsiloxane copolymers, trimethylsiloxy end-capped methylvinylpolysiloxane, trimethylsiloxy end-capped dimethylsiloxane-methylvinylsiloxane-methylphenylsiloxane copolymers, dimethylvinylsiloxy end-capped dimethylpolysiloxane, dimethylvinylsiloxy end-capped methylvinylpolysiloxane, dimethylvinylsiloxy end-capped dimethylsiloxane-methylvinylsiloxane copolymers, dimethylvinylsiloxy end-capped dimethylsiloxane-methylvinylsiloxane-methylphenylsiloxane copolymers, trivinylsiloxy end-capped dimethylpolysiloxane, copolymers consisting of siloxane units of the formula: $R^2{}_3SiO_{1/2}$, siloxane units of the formula: $R^2{}_2R^3SiO_{1/2}$, siloxane units of the formula: $R^2{}_2SiO$ and siloxane units of the formula: $SiO_2$, copolymers consisting of siloxane units of the formula: $R^2{}_3SiO_{1/2}$, siloxane units of the formula: $R^2{}_2R^3SiO_{1/2}$, and siloxane units of the formula: $SiO_2$, copolymers consisting of siloxane units of the formula: $R^2{}_2R^3SiO_{1/2}$, siloxane units of the formula: $R^2{}_2SiO$ and siloxane units of the formula: $SiO_2$, copolymers consisting of siloxane units of the formula: $R^2R^3SiO$ and siloxane units of the formula: $R^2SiO_{3/2}$ or $R^3SiO_{3/2}$, and mixtures of two or more of the foregoing, wherein $R^2$ is a substituted or unsubstituted monovalent hydrocarbon group exclusive of alkenyl groups, and $R^3$ is an alkenyl group.

Throughout the specification, the term "end-capped" used in connection with siloxanes means that a siloxane is capped with a specified group at each end of its molecular chain.

In the above formulae, $R^2$ is selected from substituted or unsubstituted monovalent hydrocarbon groups, for example, alkyl groups such as methyl, ethyl, propyl, butyl, pentyl, hexyl, and heptyl; aryl groups such as phenyl, tolyl, xylyl and naphthyl; aralkyl groups such as benzyl and phenethyl; and haloalkyl groups such as chloromethyl, 3-chloropropyl and 3,3,3-trifluoropropyl. $R^3$ is an alkenyl group such as vinyl, allyl, butenyl, pentenyl, hexenyl or heptenyl.

Component B

The organohydrogenpolysiloxane (B) reacts with component (A) and serves as a crosslinking agent. The molecular structure of the organohydrogenpolysiloxane is not particularly limited. It may be any of organohydrogenpolysiloxanes prepared to a linear, branched, cyclic or three-dimensional network (resinous) structure in a conventional way.

The organohydrogenpolysiloxane (B) should contain at least two, preferably at least three silicon atom-bonded hydrogen atoms (i.e., hydrosilyl or SiH groups) on the molecule. Specifically, it contains preferably 3 to about 500, more preferably 3 to about 200, most preferably 3 to about 100 silicon atom-bonded hydrogen atoms. In the case of organohydrogenpolysiloxane having a linear structure, hydrogen atoms may be bonded to any silicon atoms at ends or intermediate positions of the molecular chain or both.

For component (B), the number of silicon atoms per molecule (or degree of polymerization) is preferably 2 to about 1,000, more preferably 3 to about 300, and even more preferably 4 to about 150. Component (B) should preferably have a viscosity at 25° C. of 0.1 to 5,000 mPa-s, more preferably 0.5 to 1,000 mPa-s, and even more preferably 3 to 500 mPa-s. Too low a viscosity may adversely affect workability during mixing, lead to too low a finish viscosity after mixing, and require a longer cure time. Too high a viscosity may adversely affect workability during mixing and interfere with intimate mixing.

Typical of the organohydrogenpolysiloxane are those having the average compositional formula (2).

$$R^4{}_aH_bSiO_{(4-a-b)/2} \qquad (2)$$

Herein $R^4$ is each independently a substituted or unsubstituted monovalent hydrocarbon group free of aliphatic unsaturation, bonded to a silicon atom. The subscripts "a" and "b" are numbers satisfying $0.7 \leq a \leq 2.1$, $0.001 \leq b \leq 1.0$, and $0.8 < a+b \leq 3.0$, preferably $0.9 \leq a\ 2.0$, $0.01 \leq b \leq 1.0$ and $1.0 \leq a+b \leq 2.5$.

In formula (2), the substituted or unsubstituted monovalent hydrocarbon groups free of aliphatic unsaturation represented by $R^4$ include those of 1 to 14 carbon atoms, preferably 1 to 10 carbon atoms, for example, alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenethyl and phenylpropyl, and substituted forms of the foregoing groups in which some or all hydrogen atoms are substituted by halogen atoms (e.g., fluoro, bromo, chloro), such as chloromethyl, 3-chloropropyl, bromoethyl and 3,3,3-trifluoropropyl. Of these, alkyl and aryl groups are preferred, with methyl and phenyl being most preferred.

Examples of the organohydrogenpolysiloxane (B) include 1,1,3,3-tetramethyldisiloxane, 1,3,5,7-tetramethyltetracyclosiloxane, tris(dimethylhydrogensiloxy)methylsilane, tris (dimethylhydrogensiloxy)phenylsilane, trimethylsiloxy end-capped methylhydrogenpolysiloxane, trimethylsiloxy end-capped dimethylsiloxane-methylhydrogensiloxane copolymers, trimethylsiloxy end-capped dimethylsiloxane-methylhydrogensiloxane-methylphenylsiloxane copolymers, dimethylhydrogensiloxy end-capped dimethylpolysiloxane, dimethylhydrogensiloxy end-capped dimethylsiloxane-methylhydrogensiloxane copolymers, dimethylhydrogensiloxy end-capped dimethylsiloxane-methylphenylsiloxane copolymers, dimethylhydrogensiloxy end-capped methylphenylpolysiloxane, organosiloxane copolymers consisting of siloxane units of the formula: $R^2{}_3SiO_{1/2}$, siloxane units of the formula: $R^2{}_2HSiO_{1/2}$ and siloxane units of the formula: $SiO_2$, organosiloxane copolymers consisting of siloxane units of the formula: $R^2{}_2HSiO_{1/2}$ and siloxane units of the formula: $SiO_2$, organosiloxane copolymers consisting of siloxane units of the formula: $R^2HSiO$, siloxane units of the formula: $R^2SiO_{3/2}$ and siloxane units of the formula: $HSiO_{3/2}$, alone or in admixture wherein $R^2$ is as defined above for component (A).

The organohydrogenpolysiloxane used herein may be prepared by any well-known methods. For example, it can be readily prepared by equilibrating 1,3,5,7-tetramethyl-1,3,5, 7-tetrahydrocyclotetrasiloxane (or a mixture thereof with octamethylcyclotetrasiloxane) and a siloxane compound serving as a terminal source such as hexamethyldisiloxane or 1,3-dihydro-1,1,3,3-tetramethyldisiloxane, or octamethylcyclotetrasiloxane and 1,3-dihydro-1,1,3,3-tetramethyldisiloxane at a temperature of the order of −10° C. to +40° C. in the presence of a catalyst such as sulfuric acid, trifluoromethanesulfonic acid or methanesulfonic acid.

Component (B) is compounded in such amounts that 0.5 to 3.0 moles, preferably 0.6 to 1.5 moles of silicon-bonded hydrogen atoms (i.e., SiH groups) in component (B) are available per mole of silicon-bonded alkenyl groups in component (A). With too less amounts of component (B), the composition becomes undercured. Too much amounts of component (B) have noticeable negative impact on the heat resistance of silicone rubber.

Component C

Any hydrosilylation catalyst may be used as component (C) as long as it is effective for promoting the addition reaction between alkenyl groups in component (A) and SiH groups in component (B). Exemplary catalysts include platinum base catalysts such as chloroplatinic acid, alcohol-modified chloroplatinic acid, and coordination compounds of chloroplatinic acid with olefins, vinylsiloxanes or acetylene compounds; palladium base catalysts such as tetrakis(triphenylphosphine)palladium; and rhodium base catalysts such as chlorotris(triphenylphosphine)rhodium. The platinum base catalysts are preferred.

Component (C) is used in catalytic amounts, that is, effective amounts to promote hydrosilylation reaction. Preferably component (C) is used in such amounts as to give 0.1 to 1,000 ppm, more preferably 1 to 500 ppm, even more preferably 10 to 100 ppm of catalytic metal based on the weight of components (A) and (B) combined. Addition amounts of the catalyst within this range ensure promoted addition reaction, full cure and economical advantages.

Component D

The adhesive component (D) is essential for imparting adhesion to the inventive composition. It is obtained by previously mixing (i) a titanium chelate catalyst and/or an organoxytitanium of the general formula (1) and (ii) a silane coupling agent and aging the mixture.

$$Ti(OR^1)_4 \quad (1)$$

Herein $R^1$ is a monovalent hydrocarbon group of 2 to 10 carbon atoms. Examples of the monovalent $C_2$-$C_{10}$ hydrocarbon group represented by $R^1$ include, but are not limited to, alkyl groups such as ethyl, propyl, isopropyl, butyl, isobutyl, tert-butyl, tert-amyl, pentyl, neopentyl, hexyl, octyl, nonyl and decyl, and alkoxyalkyl groups such as methoxyethyl, ethoxyethyl, propoxyethyl, methoxypropyl, and ethoxypropyl.

Examples of the titanium chelate catalyst include, but are not limited to, diisopropoxybis(ethyl acetoacetate)-titanium, titanium acetylacetonate, titanium ethylacetonate, titanium octane dioleate, and dibutoxybis(ethyl acetoacetate)titanium.

Examples of the organoxytitanium of formula (1) include, but are not limited to, tetra-tert-butoxytitanium, tetraisopropyl titanate, tetra-n-butyl titanate, tetra(2-ethylhexyl) titanate, tetraisobutyl titanate, tetra(2-methyl-2-butoxy) titanate, tetra-n-propyl titanate, tetraethyl titanate, tetrahexyl titanate, tetraoctyl titanate, tetranonyl titanate, and tetradecyl titanate.

The silane coupling agents used in component (D) include (meth)acryloyl-containing silane coupling agents, epoxy-containing silane coupling agents and the like. Of these, the epoxy-containing silane coupling agents are preferred, examples of which include
β-(3,4-epoxycyclohexyl)ethyltrimethoxysilane,
γ-glycidoxypropyltrimethoxysilane, and
γ-glycidoxypropylmethyltriethoxysilane.

For brevity sake, the titanium chelate catalyst and the organoxytitanium of formula (1) are collectively referred to as "titanium catalyst," hereinafter. The titanium catalyst and the silane coupling agent must be mixed and the mixture be aged before the adhesive component (D) can be obtained. As used herein, the term "aging" or "aged" means that ester exchange reaction occurs between some alkoxy groups on the titanium catalyst and some alkoxy groups on the silane coupling agent and/or a portion of the silane coupling agent is hydrolyzed with airborne or otherwise available moisture in the presence of the titanium catalyst to form an oligomer.

The silane coupling agent (ii) and the titanium catalyst (i) are mixed in a weight ratio (ii)/(i) in the range of 0.2/1 to 5.0/1, preferably 0.5/1 to 3.0/1. At a weight ratio (ii)/(i) of less than 0.2, no satisfactory adhesion is achieved. A weight ratio (ii)/(i) of greater than 5.0 results in the drawbacks of retarding the composition from curing and degrading the physical and mechanical properties of cured rubber and is uneconomical.

With respect to the aging of the titanium catalyst/silane coupling agent mixture, heat aging is preferred because heat can promote aging. Heat aging conditions include in a preferred embodiment, a temperature of 40 to 100° C. and a time of 1 to 1,000 hours, and in a more preferred embodiment, a temperature of 50 to 80° C. and a time of 5 to 100 hours. At temperatures below 40° C., the aging may not reach equilibrium, failing to achieve satisfactory adhesion. Temperatures above 100° C. can reduce the catalysis of the titanium catalyst in the mixture or component (D). Too short heat treatment may fail to achieve satisfactory adhesion whereas too long heat treatment is an excessive time consumption for the preparation of component (D), which is unwanted from the productivity aspect. If heat treatment is extremely extended, for example, as long as 10,000 hours or more, there is a possibility that component (D) will cure by itself or lose catalytic activity.

An appropriate amount of component (D) compounded is 0.2 to 10 parts by weight, preferably 0.5 to 5 parts by weight per 100 parts by weight of component (A). Less than 0.2 pbw of component (D) fails to achieve satisfactory adhesion or produce a cured composition having desired rubber elasticity. More than 10 pbw of component (D) adversely affects cure, detracting from the mechanical properties of cured product.

Other Components

In addition to components (A) to (D), the organopolysiloxane composition of the invention may include other optional components as long as they do not compromise the objects of the invention.

One typical component is (E) a non-reactive silicone fluid. It is optional and need not be necessarily added to the composition. The preferred non-reactive silicone fluid (E) is a trimethylsilyl end-capped polydimethylsiloxane. By compounding component (E), the flow of the composition and the rubber physical properties after curing can be adjusted. The non-reactive silicone fluid should preferably have a viscosity at 25° C. of 5 to 50,000 mPa-s, more preferably 50 to 5,000 mPa-s. The amount of component (E) may be 0 to 50 parts by weight per 100 parts by weight of component (A), and when compounded, the preferred amount is 1 to 50 parts by weight.

Another optional component is a reaction inhibitor which is known to be effective in retarding cure against the addition reaction catalyst. Suitable inhibitors include phosphorus-containing compounds such as triphenylphosphine; nitrogen-containing compounds such as tributylamine, tetramethylethylenediamine and benzotriazole; sulfur-containing compounds; acetylene compounds such as 1-ethynyl-1-hexanol; triallyl isocyanuric acid, hydroperoxy compounds, maleic acid derivatives, and the like. The extent of cure-retarding effect of the inhibitor largely varies with its chemical structure. Accordingly, the amount of the inhibitor added should be adjusted optimum for a particular inhibitor compound employed, and such an optimum amount can readily be determined by those skilled in the art without undue experimentation. In general, too small amounts of the inhibitor added do not ensure the long-term shelf stability of the composition at room temperature whereas too large amounts restrain the composition from curing.

A further optional component is a filler. Included are inorganic fillers such as fumed silica, crystalline silica, precipitated silica, hollow fillers, silsesquioxane, fumed titanium dioxide, magnesium oxide, zinc oxide, iron oxide, aluminum hydroxide, magnesium carbonate, calcium carbonate, zinc carbonate, laminar mica, carbon black, diatomaceous earth, and glass fibers; and the foregoing fillers which have been surface treated with organosilicon compounds such as organoalkoxysilane compounds, organochlorosilane compounds, organosilazane compounds, and low-molecular-weight siloxane compounds. Silicone rubber powder and silicone resin powder are also suitable as the filler.

Other optional components include organopolysiloxanes containing one silicon-bonded hydrogen atom or alkenyl group on the molecule, organopolysiloxanes containing neither silicon-bonded hydrogen atom nor alkenyl group, organic solvents, anti-crepe-hardening agents, heat resistance modifiers, flame retardants, plasticizers, thixotropic agents, pigments, dyes and mildewproofing agents.

Use

The self-adhesive organopolysiloxane compositions of the invention cure effectively at room temperature, typically from 20° C. to less than 30° C. and lower temperatures, typically from −10° C. to less than 20° C. They firmly bond to metal, plastic and other substrates without a need for primers. Accordingly, the compositions can be used as sealants, potting materials and coating materials, for example, as coating or sealing materials for electronic substrates.

The organopolysiloxane compositions of the invention cure under conditions similar to those used in well-known addition reaction curing silicone rubber compositions. The compositions fully cure even at room temperature, but may be heated if necessary.

EXAMPLE

Examples and Comparative Examples are given below for illustrating the present invention although the invention is not limited thereto. All parts are by weight. The viscosity is measured by a rotational viscometer at 25° C.

Synthesis Example 1

In a closed vessel having an internal volume of 1 liter, 300 g of γ-glycidoxypropyltrimethoxysilane and 300 g of diisopropoxybis(ethyl acetoacetate)titanium were mixed and aged at 70° C. for 24 hours in the closed condition, yielding a pale yellow clear liquid. The liquid was analyzed by $^{29}$Si-NMR, confirming the splitting of Si peak of γ-glycidoxypropyltrimethoxysilane, proving the occurrence of ester exchange reaction and hydrolysis during the aging. This is designated aged adhesive component D1.

Synthesis Example 2

In a closed vessel having an internal volume of 1 liter, 300 g of γ-glycidoxypropyltrimethoxysilane and 300 g of tetra-tert-butoxytitanium were mixed and aged at 70° C. for 24 hours in the closed condition, yielding a pale yellow clear liquid. The liquid was analyzed by $^{29}$Si-NMR, confirming the splitting of Si peak of γ-glycidoxypropyltrimethoxysilane, proving the occurrence of ester exchange reaction and hydrolysis during the aging. This is designated aged adhesive component D2.

Example 1

To (A) 100 parts of a dimethylvinylsiloxy end-capped dimethylpolysiloxane having a viscosity of 15,000 mPa·s were added (B) 2.2 parts of a dimethylhydrogensiloxy end-capped methylhydrogenpolysiloxane (SiH group content=30 wt %) having a viscosity of 7 mPa·s (a molar ratio of SiH groups in component B to vinyl groups in component A=0.8), (C) 1,000 ppm as platinum metal based on the total weight of components A and B of a chloroplatinic acid-divinyltetramethyldisiloxane complex, (D) 1 part of aged adhesive component D1, and 0.05 part of a cure inhibitor which was a mixture of 2,4,6,8-tetravinyl-2,4,6,8-tetramethylcyclotetrasiloxane and methyl end-capped polydimethylsiloxane in a weight ratio of 5/95. A composition was prepared by mixing the ingredients in a moisture-barrier atmosphere until uniform.

Example 2

A composition was prepared as in Example 1 aside from using aged adhesive component D2 instead of D1.

Comparative Example 1

A composition was prepared as in Example 1 except that instead of aged adhesive component D1, 0.5 part of γ-glycidoxypropyltrimethoxysilane and 0.5 part of diisopropoxybis (ethyl acetoacetate)titanium were added without the 70° C./24 hour aging.

Comparative Example 2

A composition was prepared as in Example 2 except that instead of aged adhesive component D2, 0.5 part of γ-glycidoxypropyltrimethoxysilane and 0.5 part of tetra-tert-butoxytitanium were added without the 70° C./24 hour aging.

Comparative Example 3

A composition was prepared as in Example 1 except that 1 part of an aged catalyst was added instead of aged adhesive component D1, which catalyst had been prepared by mixing 10 g of γ-glycidoxypropyltrimethoxysilane and 100 g of diisopropoxybis(ethyl acetoacetate)titanium (a weight ratio of silane coupling agent to titanium catalyst=0.10) and aging the mixture at 70° C. for 24 hours.

Comparative Example 4

A composition was prepared as in Example 1 except that 1 part of an aged catalyst was added instead of aged adhesive component D1, which catalyst had been prepared by mixing 100 g of γ-glycidoxypropyltrimethoxysilane and 15 g of diisopropoxybis(ethyl acetoacetate)titanium (a weight ratio of silane coupling agent to titanium catalyst=6.7) and aging the mixture at 70° C. for 24 hours.

For each of Examples and Comparative Examples, the components were metered into a test container where they were mixed until uniform. By visual observation, the time passed until the mixture ceased to flow even when the container was inclined was determined. This is defined as flow terminus time. The flow terminus time was determined while the viscosity at 25° C. of the mixture was measured by a rotational viscometer.

Each composition of Examples and Comparative Examples was shaped into a sheet of 2 mm thick and cured at room temperature (RT) for 3 days or at 120° C. for one hour, after which rubber physical properties (hardness, elongation at break and tensile strength) were measured according to JIS K6249.

Separately, each composition was applied to an adherend of 10×50×2 mm and allowed to stand at room temperature, forming a rubber elastomer film on the adherend. By a peel test, the adhesion of the film to the adherend was visually observed. The adherends used in the test included polyphenylene sulfide (PPS) resin, syndiotactic polystyrene (SPS) resin, polybutylene terephthalate (PBT) resin, and copper. The adhesion was rated good (○) for cohesive failure, fair (Δ) when the film partially peeled, and poor (X) when the film peeled. The results are shown in Table 1.

TABLE 1

| | | Test results | | | | | |
|---|---|---|---|---|---|---|---|
| | | Example | | Comparative Example | | | |
| | | 1 | 2 | 1 | 2 | 3 | 4 |
| RT cure | Flow terminus time (min) | 15 | 15 | 15 | 15 | 15 | 30 |
| | Viscosity (Pa·s) | 10 | 10 | 11 | 10 | 11 | 9 |
| | Hardness (Durometer A) | 3 | 2 | 3 | 3 | 3 | 2 |
| | Elongation (%) | 280 | 220 | 230 | 250 | 220 | 200 |
| | Tensile strength (MPa) | 0.2 | 0.3 | 0.2 | 0.2 | 0.3 | 0.2 |
| | Adhesion  PPS | ○ | ○ | X | X | X | X |
| | SPS | ○ | ○ | X | X | X | X |
| | PBT | ○ | ○ | X | X | X | Δ |
| | Copper | ○ | ○ | ○ | ○ | ○ | Δ |
| Heat cure | Hardness (Durometer A) | 5 | 6 | 5 | 5 | 4 | 3 |
| | Elongation (%) | 230 | 250 | 200 | 210 | 220 | 190 |
| | Tensile strength (MPa) | 0.4 | 0.5 | 0.4 | 0.5 | 0.4 | 0.3 |
| | Adhesion  PPS | ○ | ○ | X | X | X | ○ |
| | SPS | ○ | ○ | X | X | X | X |
| | PBT | ○ | ○ | X | X | X | Δ |
| | Copper | ○ | ○ | ○ | ○ | ○ | ○ |

Japanese Patent Application No. 2005-183405 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

We claim:

1. A self-adhesive organopolysiloxane composition comprising
   (A) 100 parts by weight of an organopolysiloxane containing at least two silicon-bonded alkenyl groups on the molecule,
   (B) an organohydrogenpolysiloxane containing at least two silicon-bonded hydrogen atoms on the molecule, in such an amount that 0.5 to 3.0 silicon-bonded hydrogen atoms are available per silicon-bonded alkenyl group in component (A),
   (C) an effective amount of a hydrosilylation catalyst, and
   (D) 0.2 to 10 parts by weight of an adhesive component obtained by previously mixing (i) a titanium chelate catalyst and/or an organoxytitanium of the general formula (1):

$$Ti(OR^1)_4 \qquad (1)$$

wherein $R^1$ is a monovalent hydrocarbon group of 2 to 10 carbon atoms and (ii) a silane coupling agent in a weight ratio (ii)/(i) in the range of 0.2 to 5.0, and aging the mixture by heating it at 40 to 100° C. for 5 to 100 hours whereby ester exchange reaction occurs between some alkoxy groups on the titanium catalyst and some alkoxy groups on the silane coupling agent and/or a portion of the silane coupling agent is hydrolyzed with moisture that is airborne or otherwise available in the presence of the titanium catalyst to form an oligomer.

2. The composition of claim 1 wherein the silane coupling agent (ii) is an epoxy-containing silane coupling agent.

3. The composition of claim 1, wherein the organopolysiloxane containing at least two silicon-bonded alkenyl groups on the molecule has a viscosity at 25° C. of 500 to 100,000 mPa·s.

4. The composition of claim 1, wherein the organohydrogenpolysiloxane containing at least two silicon-bonded hydrogen atoms on the molecule has a viscosity at 25° C. of 3 to 500 mPa·s.

5. The composition of claim 1, wherein the hydrosilylation catalyst is a platinum base catalyst.

6. The composition of claim 1, wherein component (D)(i) is
   diisopropoxybis(ethyl acetoacetate)titanium,
   titanium acetylacetonate,
   titanium ethylacetonate, titanium octane dioleate, or
   dibutoxybis(ethyl acetoacetate)titanium.

7. The composition of claim 1, wherein component (D)(i) is tetra-tert-butoxytitanium, tetraisopropyl titanate, tetra-n-butyl titanate, tetra(2-ethylhexyl) titanate, tetraisobutyl titanate, tetra(2-methyl-2-butoxy) titanate, tetra-n-propyl titanate, tetraethyl titanate, tetrahexyl titanate, tetraoctyl titanate, tetranonyl titanate, or tetradecyl titanate.

8. The composition of claim 1, wherein the mixture is aged by heating at 50 to 80° C. for 5 to 100 hours.

9. The composition of claim 2, wherein component (D)(ii) is
   β-(3,4-epoxycyclohexyl)ethyltrimethoxysilane,
   γ-glycidoxypropyltrimethoxysilane, or
   γ-glycidoxypropylmethyltriethoxysilane.

* * * * *